US008762543B2

(12) United States Patent
Yao et al.

(10) Patent No.: US 8,762,543 B2
(45) Date of Patent: Jun. 24, 2014

(54) METHOD AND APPARATUS FOR AUTONOMOUS PEER DISCOVERY AND ENHANCING LINK RELIABILITY FOR WIRELESS PEER DIRECT LINKS

(75) Inventors: Zongming Yao, Shanghai (CN); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1125 days.

(21) Appl. No.: 12/637,987

(22) Filed: Dec. 15, 2009

(65) Prior Publication Data

US 2011/0145421 A1    Jun. 16, 2011

(51) Int. Cl.
*G06F 15/16* (2006.01)
*G06F 15/173* (2006.01)
(52) U.S. Cl.
USPC .......................... 709/227; 709/223; 709/224
(58) Field of Classification Search
USPC .................................. 709/223, 224, 227
See application file for complete search history.

(56) References Cited

U.S. PATENT DOCUMENTS

| 5,832,368 | A  | * | 11/1998 | Nakano et al. ............ 455/63.1 |
| 7,657,239 | B2 | * | 2/2010  | Doradla et al. ........... 455/161.1 |
| 7,957,757 | B2 | * | 6/2011  | Celebi et al. ............... 455/522 |
| 7,970,361 | B2 | * | 6/2011  | Nader et al. .............. 455/115.1 |
| 8,023,468 | B2 |   | 9/2011  | Liu et al. |
| 8,149,745 | B2 |   | 4/2012  | Itagaki et al. |
| 8,284,714 | B2 | * | 10/2012 | Ray ........................... 370/328 |
| 2007/0008922 | A1 |   | 1/2007 | Hassan et al. |
| 2008/0069047 | A1 | * | 3/2008 | Yee et al. ................... 370/331 |
| 2009/0129324 | A1 |   | 5/2009 | Soneda |
| 2009/0168736 | A1 |   | 7/2009 | Itagaki et al. |
| 2009/0185529 | A1 |   | 7/2009 | Tsuji et al. |
| 2009/0274135 | A1 |   | 11/2009 | Seok |
| 2011/0034127 | A1 | * | 2/2011 | Wentink et al. ............ 455/41.2 |
| 2011/0082939 | A1 | * | 4/2011 | Montemurro et al. ........ 709/227 |
| 2011/0082940 | A1 | * | 4/2011 | Montemurro et al. ........ 709/227 |
| 2012/0163261 | A1 | * | 6/2012 | Vedantham et al. .......... 370/311 |

FOREIGN PATENT DOCUMENTS

| WO | 2004032536 | 4/2004 |
| WO | 2006081123 | 8/2006 |
| WO | 2007082254 | 7/2007 |
| WO | 2009038348 | 3/2009 |

OTHER PUBLICATIONS

Office Action received for Chinese Patent Application No. 201010604211.8, mailed Apr. 2, 2013, 12 pages, including 6 pages English translation.
International Search Report and Written Opinion received for PCT Patent Application No. PCT/US2010/054246, mailed Jul. 22, 2011, 8 pages.

(Continued)

*Primary Examiner* — Aaron Strange
(74) *Attorney, Agent, or Firm* — Kacvinsky Daisak Bluni PLLC

(57) ABSTRACT

A system, method and device may include triggering a direct connection setup based on one or more communication parameters communicated with a mobile device via a fixed device. It may be determined whether the mobile device is a peer. The quality of service with the mobile device via the fixed device may be compared with quality of service of a mobile device via a direct link. A channel for the direct link may be selected and information may be sent to the mobile device over the direct link via the channel.

22 Claims, 8 Drawing Sheets

(56) References Cited

OTHER PUBLICATIONS

Office Action received for Japanese Patent Application No. 2012-543102, mailed Sep. 10, 2013, 10 pages including 5 pages English translation.

Montemurro et al., "TDLS Peer Discovery", IEEE P802.11 Wireless LANs, Nov. 17, 2009, IEEE 802.11-09/1218r4, URL, https://mentor.ieee.org/802.11/dcn/09/11-09-1218-04-000z-tdls-peer-discovery.doc.

* cited by examiner

| MAC Header 305 | LLC/SNAP 310 | Remote Frame Type 315 | TDLS Packet Type 320 | Information 325 |
|---|---|---|---|---|

FIG. 3

| Element Identification 405 | Length 410 | BSSID 415 | Source Address 420 | Destination Address 425 | Regulatory Class 430 | Channel Number 435 |

FIG. 4

| MAC Header 505 | Category 510 | Action 515 | Dialog Token 520 | Transmit Power Used 525 | Maximum Transmit Power 530 |

FIG. 5

| MAC Header 605 | Category 610 | Action 615 | Dialog Token 620 | TPC Report Element 625 | Receive Antenna Identification 630 | Transmit Antenna Identification 635 | Received Channel Power Indicator 640 | Received Signal to Noise Indicator 645 |

FIG. 6

METHOD AND APPARATUS FOR AUTONOMOUS PEER DISCOVERY AND ENHANCING LINK RELIABILITY FOR WIRELESS PEER DIRECT LINKS

BACKGROUND

Stations often communicate via a fixed device in a wireless local area network. However, two stations communicating over the same wireless infrastructure may set up a direct link for communication. While the direct link for communication may be beneficial, many issues, such as, when to set up and/or when to terminate a direct link, are unresolved.

BRIEF DESCRIPTION OF THE DRAWINGS

FIG. 3 illustrates one embodiment of a tunneled direct link setup (TDLS) frame format.

FIG. 4 illustrates one embodiment of a link identifier element.

FIG. 5 illustrates one embodiment of a link measurement request.

FIG. 6 illustrates one embodiment of link measurement report.

DETAILED DESCRIPTION

Various embodiments may be generally directed to autonomous peer discovery and enhancing link reliability for wireless peer direct links. In one embodiment, for example, a direct connection setup may be triggered based on one or more communication parameters communicated with a mobile device via a fixed device. It may be determined whether the mobile device is a peer. The quality of service with the mobile device via the fixed device may be compared with quality of service of a mobile device via a direct link. A channel may be selected for the direct link. Information may be sent to the mobile device over the direct link via the channel. Other embodiments may be described and claimed.

In this manner, the quality of service of communication between two mobile devices may be improved. By creating a direct link between two peer mobile devices, high throughput applications such as, but not limited to, peer-to-peer video may be substantially improved over the communication between the wireless devices via a fixed device. A direct link may improve communication between two mobile devices by increasing the reliability and predictability of communication. A direct link may increase the suitability for product implementation.

Various embodiments may comprise a communications system having various types of wireless devices, such as one or more fixed devices and two or more mobile devices. An example of a communications system may comprise a wireless communications system which is targeted to set up a direct link communication between two peer mobile devices over a fixed wireless infrastructure device such as an 802.11 access point.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
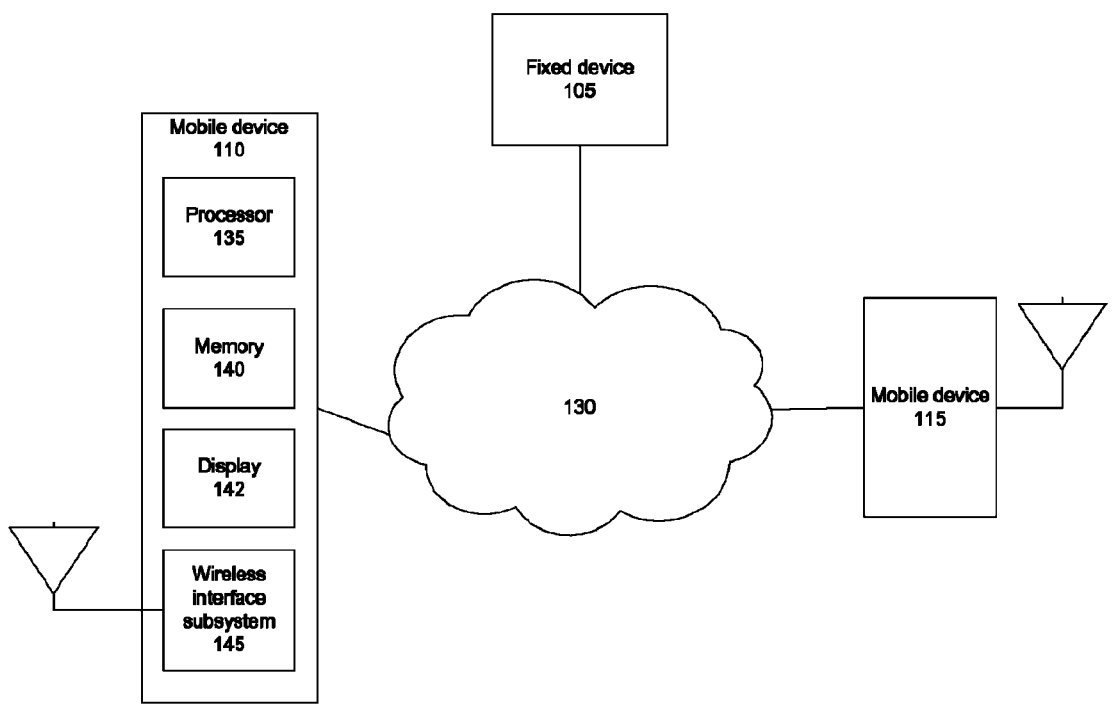
FIG. 1 illustrates one embodiment of a block diagram of a communications system.

FIG. 1 illustrates one embodiment of a block diagram of a communications system. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wireless communication links, such as wireless shared media 130. Examples of a wireless communication link may include, without limitation, a Wireless Fidelity (WiFi) channel, operating in one or more licensed or license-free frequency bands. The wireless nodes may include one or more wireless interface subsystems and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple elements, such as a fixed device 105 and two or more mobile devices 110, 115. As shown by mobile device 110, the mobile device 110 may include a processor 135, a memory unit 140, a display 142 and a wireless interface subsystem 145. The embodiments, however, are not limited to the elements shown in FIG. 1.

In various embodiments, the communications system 100 may comprise or be implemented as a mobile broadband communications system. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others.

In one embodiment, for example, the communications system 100 may be implemented in accordance with the 802.11z TGz task group, IEEE 802.11z proposed standard. The 802.11z standard may provide tunneled direct link setup in WLANs between two mobile devices 110, 115.

In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e Cor2/D3-2005) are Physical (PHY) layer specifications. WiMAX II is an advanced Fourth Generation (4G) system based on the IEEE 802.16m and IEEE 802.16j proposed standards for International Mobile Telecommunications (IMT) Advanced 4G series of standards. Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, 3rd Generation Partnership Project (3GPP) Rel. 8 and 9 of Long Term Evolution (LTE)/System Architecture Evolution (SAE) and so forth. The embodiments are not limited in this context.

In various embodiments, the communications system 100 may comprise a fixed device 105 having wireless capabilities. A fixed device 105 may comprise a generalized equipment set providing connectivity and/or information to another wireless device, such as one or more mobile devices. Examples for the fixed device 105 may include, but are not limited to, a wireless access point (AP), base station or node B, router, switch, hub and/or gateway. In one embodiment, the fixed device 105 may include two or more of the above devices located within the same network. For example, fixed device 105 may include two access points located in the same provider network. The two access points may have the same service set identifier (SSID). Although some embodiments may be described with the fixed device 105 implemented as an access point, by way of example, it may be appreciated that other embodiments may be implemented using other wireless devices as well. The embodiments are not limited in this context.

In various embodiments, the communications system 100 may comprise a set of mobile devices 110, 115 having wireless capabilities. The mobile devices 110, 115 may comprise a generalized equipment set providing connectivity to other wireless devices, such as other mobile devices or fixed devices (e.g., fixed device 105). Examples for the mobile devices 110, 115 may include without limitation a computer, server, workstation, notebook computer, handheld computer, telephone, cellular telephone, personal digital assistant (PDA), combination cellular telephone and PDA, and so forth. In one embodiment, for example, the mobile devices 110, 115 may be implemented as mobile subscriber stations (MSS) for a WMAN. Although some embodiments may be described with the mobile devices 110, 115 implemented as a MSS by way of example, it may be appreciated that other embodiments may be implemented using other wireless devices as well. The embodiments are not limited in this context.

In one embodiment, two mobile devices 110, 115 may connect to the same fixed device. The two mobile devices 110, 115 may be located in proximity to one another. For example, in an 802.11 WLAN the two mobile devices may be less than 100 meters from one another. In one embodiment the first mobile device 110 may be located remotely from the second mobile device 115. The embodiments are not limited to the distances disclosed.

The mobile device may include a processor 135, a memory unit 140, a digital display device 142 and a wireless interface subsystem 145. As shown by the mobile device 110, the mobile device 110 may comprise a processor 135. The processor 135 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 135 may be implemented as a general purpose processor, such as a processor made by Intel® Corporation, Santa Clara, Calif. The processor 135 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 110, the mobile device 110 may comprise a memory unit 140. The memory 140 may comprise any machine-readable or computer-readable media capable of storing data, including both volatile and non-volatile memory. For example, the memory 140 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 140 may be included on the same integrated circuit as the processor 135, or alternatively some portion or all of the memory 140 may be disposed on an integrated circuit or other medium, for example a hard disk drive, that is external to the integrated circuit of the processor 135. In one embodiment, the memory may include data and instructions to operate the processor. The embodiments are not limited in this context.

As further shown by the mobile device 110, the mobile devices 110 may include a display 142. Display 142 may include any suitable display unit for displaying information appropriate for a mobile computing device. In addition, display 142 may be implemented as an additional I/O device, such as a touch screen, touch panel, touch screen panel, and so forth. Touch screens are display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays allows a display to be used as an input device, to remove or enhance the keyboard and/or the mouse as the primary input device for interacting with content provided on display 142.

In one embodiment, for example, display 142 may be implemented by a liquid crystal display (LCD) or other type of suitable visual interface. Display 142 may include, for example, a touch-sensitive color (e.g., 56-bit color) display screen. In various implementations, the display 142 may include one or more thin-film transistors (TFT) LCD including embedded transistors. In such implementations, the display 142 may include a transistor for each pixel to implement an active matrix. While the embodiments are not limited in this context, an active matrix display is desirable since it requires lower current to trigger pixel illumination and is more responsive to change than a passive matrix.

In various embodiments, the mobile device 110 may communicate information over wireless shared media 130 via a wireless interface subsystem 145. In an embodiment, the wireless interface subsystem may communicate via a radio. The wireless shared media 130 may comprise one or more allocations of RF spectrum. The allocations of RF spectrum may be contiguous or non-contiguous. In some embodiments, the wireless interface subsystem 145 may communicate information over the wireless shared media 130 using various multicarrier techniques utilized by, for example, WiMAX or WiMAX II systems or WLAN systems. For example, the wireless interface subsystems 145 may utilize various Multiple-Input Multiple-Output (MIMO) techniques.

In various embodiments, the mobile devices 110, 115 may communicate with one another via the fixed device 105 over the same wireless infrastructure. In one embodiment, the peer-to-peer communication may include, but is not limited to, voice over internet protocol (Von)), peer to peer file uploading, peer to peer downloading and/or video-over-wireless communication in a WLAN infrastructure. In one embodiment, communication between the mobile devices through the fixed device may deteriorate and the two mobile devices may negotiate and setup a direct peer link.

Figure 2:
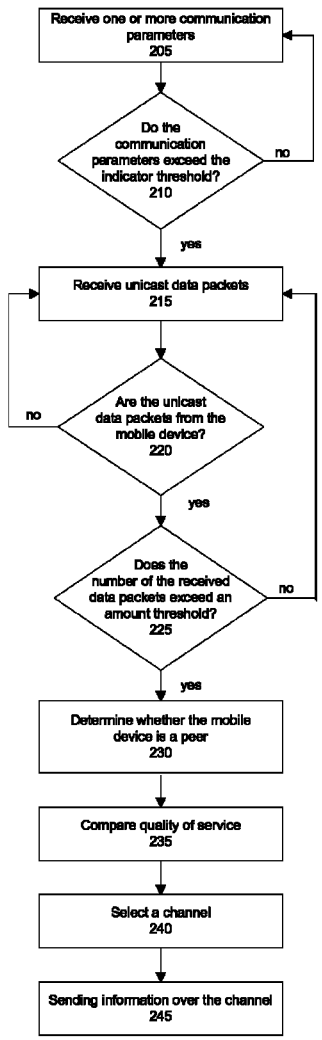
FIG. 2 illustrates one embodiment of a logic flow for creating a direct link.

FIG. 2 illustrates one embodiment of a logic flow for creating a direct link. In one embodiment, the first mobile device may receive and send packets to the second mobile device via the fixed device. The packets may include, but are not limited to, management frames, data frames, control frames, unicast data, broadcast data and/or multicast data. In one embodiment, the first mobile device may receive 205 one or more communication parameters based on the packets. In one embodiment, the first mobile device may monitor and update one or more communication parameters based on the packets. In one embodiment, the communication parameters may be characteristics or indicators of the packets. In one embodiment, the communication parameters may be tunneled direct link setup (TDLS) indicators. In one embodiment, the communication parameters may be used to determine whether a direct connection setup should be triggered. The communication parameters may include, but are not limited to, a received signal strength indicator (RSSI), transmit/receive (Tx/Rx) retries, missed beacons and/or packet error rate. In one embodiment, the communication parameters may provide information about the connection between the first mobile device and the second mobile device via the fixed device. In one embodiment, the indicators may be used to determine a quality of service between the mobile devices using the fixed device.

It may be determined whether the communication parameters exceed 210 an indicator threshold using communication with a mobile device via a fixed device. In one embodiment, the indicator threshold may be a quality of service level threshold based on one or more of the communication parameters. In one embodiment, an indicator threshold may be determined by the first mobile device. In one embodiment, an indicator threshold may be determined by a user. For example, an indicator threshold using a value of transmit/receive (Tx/Rx) retries may be exceeded when a packet is sent 7 times before it successfully reaches to the second mobile device. In one embodiment, an indicator threshold using a missed beacons value may be exceeded when the first mobile device consecutively misses receiving 20 beacons. In one embodiment, an indicator threshold using a packet error rate may exceeded based on a ratio of failed transmitted packets over the number of transmitted packets. In one embodiment, the communication parameters may not exceed the indicator threshold and the device may continue 205 to update the communication parameters until the indicator threshold is reached.

In one embodiment, the communication parameters may exceed 210 the indicator threshold. In one embodiment, a first mobile device may receive 215 unicast data packets. In one embodiment, a timer may be set by the first mobile device. The timer may begin and the first mobile device may receive 215 unicast data packets until the timer ends. In one embodiment, the timer may be set from 1 second to 20 seconds. In one embodiment, the timer may be set for 10 seconds. In one embodiment, unicast data packets may be packets sent from a second mobile device via the fixed device. The second mobile device may associate with the same fixed device as the first mobile device, such as but not limited to, an 802.11 WLAN AP. In one embodiment, unicast data packets may be sent from other mobile devices via the fixed device. In one embodiment, the unicast data packets may be, but are not limited to, User Datagram Protocol (UDP) and/or Transmission Control Protocol (TCP) data packets.

In one embodiment, after the timer ends, the unicast data packets may be examined. It may be determined 220 whether the unicast data packets from the second mobile device. In one embodiment, it may be determined whether a threshold percentage of the received unicast data packets are from the second mobile device. In one embodiment, the threshold percentage may be whether a certain number of the unicast data packets are from the second mobile device. For example, in order to trigger a direct connection, at least 90% the unicast data packets must be from the second mobile device. If the threshold percentage is not exceeded, then more unicast data packets may be collected.

If the unicast packets are from the second mobile device, then it may be determined 225 whether the number of data packets received exceeds an amount threshold. In one embodiment, determining whether the number of data packets received exceeds an amount threshold may depend on the applications communicating over the link. For example, for voice packets, the inter-arrival rate of packets may be 20 milliseconds, while for video packets, the inter-arrival rate may occur in bursts. By determining the number of data packets received within the period before the timer expires, an estimate of the amount of data packets being received from the second mobile device may be determined.

If the number of received unicast data packets does not exceed the amount threshold, then the statistics may be reset and new unicast data packets may be received 215. If it is determined 225 that the number of data packets received exceeds an amount threshold, then the timer may be stopped. In one embodiment, it may be determined 230 whether the second mobile device is a peer. A layer two service discovery request may be sent by using a tunneled direct link setup (TDLS) frame format and link identifier elements. In one embodiment, the second mobile device is a peer to the first mobile device if both mobile devices associate with the same fixed device. For example, in an 802.11 WLAN, two mobile devices may communicate through infrastructure which may be connected by a fixed device, such as, but not limited to an access point. The first mobile device may send a layer two service discovery request to the second mobile device. The second mobile device may return a layer two service discovery response to the mobile device. In one embodiment, the layer two service discovery request may be sent from the first mobile device to the second mobile device through the fixed device. The first mobile device may determine whether the second mobile device associates with same fixed device as the first mobile device through a direct link.

In one embodiment, a TDLS frame format may be used in the layer two service discovery request and layer two service discovery response. FIG. 3 illustrates one embodiment of a TDLS frame format defined by IEEE 802.11z proposed standard. The TDLS frame may include an 802.11 MAC header field 305. The TDLS frame may include a logical link control/subnetwork access protocol (LLC/SNAP) header field 310. The LLC/SNAP header field may be used to distinguish TDLS related packets from other IEEE 802.2 packets. In one embodiment, the LLC/SNAP header field may include Ethertype 0x890d. In one embodiment, a remote frame type field 315 may be set to 2. In one embodiment, the packet type field 320 may be set to 10 for a layer two service discovery request and may be set to 11 for a layer two service discovery response. In one embodiment, the TDLS frame format may include an information field 325. The information field may include information used to determine whether the two mobile devices are peers. In one embodiment, an IEEE 802.11z link identifier element could be included in the information field.

FIG. 4 illustrates one embodiment of an IEEE 802.11z link identifier element. In one embodiment, the IEEE 802.11z link identifier element may be included in the information field in the TDLS frame format illustrated in FIG. 3. In one embodiment, the IEEE 802.11z link identifier element may be part of the content of layer two service discovery request or response frames. This IEEE 802.11z link identifier element may include an element identification field 405 and a length field 410. In one embodiment, an IEEE 802.11z link identifier element may include a basic service set identifier (BSSID) field 415 to uniquely identify each basic service set (BSS). In one embodiment, the BSSID may be a MAC address for a wireless access point. In one embodiment, an IEEE 802.11z link identifier element may include a source address field 420, a destination address field 425, a regulatory class field 430 and/or a channel number field 435.

In one embodiment, the first mobile device may receive a layer two service discovery response from the second mobile device. In one embodiment, the layer two discovery response must be received by the first mobile device within a time period. If the layer two discovery response is not received within the time period, the layer two discovery request may be resubmitted and/or the first mobile device a direct link may not be established.

Referring back to FIG. 2, the layer two service discovery response may be parsed to determine 230 whether the second mobile device is a peer of the first mobile device. If the second mobile device is not a peer, then a direct link may not be established and the first mobile device may continue to receive one or more communication parameters. If the second mobile device is a peer, the quality of service of the direct link may be determined.

In one embodiment, the quality of service between the first mobile device and the second mobile device via a direct link may be compared 235 to the quality of service between the first mobile device and the second mobile device via the fixed device. The first mobile device may send a link measurement request directly to the second mobile device to determine the quality of service of the direct link. In one embodiment, a link measurement request may be exchanged directly between the first mobile device and the second mobile device without involving the fixed device. In one embodiment, the link measurement request may be transmitted as independent basic service set (IBSS) 802.11 action frames.

FIG. 5 illustrates one embodiment of a link measurement request frame. In one embodiment, a link measurement request frame may include a MAC header 505 field and a category field 510. In one embodiment, the category field 510 may indicate a radio measurement category. In one embodiment, the link measurement request frame may include an action field 515 that indicates that the frame is a link measurement request. In one embodiment, the link measurement request frame may include a dialog token field 520 which may be set to a non-zero value chosen by the first mobile device to identify the transaction. In one embodiment, the link measurement request frame may include a transmit power used field 525. The transmit power used field may include the transmit power used to transmit the frame containing the link measurement request. In one embodiment, the link measurement request frame may include power level information about the first mobile device. In one embodiment, the link measurement request frame may include a maximum transmit power field 530 which provides an upper limit of the transmit power measured at the output of the first mobile device. In one embodiment, the maximum transmit power field may be an upper limit on the transmit power as measured at the output of the antenna connector of the transmitting mobile device on its operating channel.

Referring back to FIG. 2, to determine 235 if the direct link should be used for communication, a link measurement report frame may be received from the second mobile device. In one embodiment, the link measurement report must be received by the first mobile device within a time period. If the link measurement report is not received within the time period, a direct link may not be established and/or the link measurement request may be resubmitted to the second mobile device.

In one embodiment, the link measurement report may be exchanged directly between the second mobile device and the first mobile device without involving the fixed device in the exchange. In one embodiment, the link measurement report may be transmitted as independent basic service set (IBSS) 802.11 action frames.

FIG. 6 illustrates one embodiment of a link measurement report frame. A link measurement report may include a MAC header field 605 and a category field 610. In one embodiment, the category field 610 may indicate a radio measurement category. In one embodiment, the link measurement report may include an action field 615 which may indicate that the frame is a link measurement report. In one embodiment, the link measurement report may include a dialog token field 620 which may indicate a dialog token value in the corresponding link measurement request frame. In one embodiment, the link measurement report may include a Transmit Power Control (TPC) report element field 625. The TPC report element field may which include the transmit power and the link margin information. In one embodiment, the link measurement report may include a receive antenna identification field 630 which may include the identifying number for the one or more antennas used to receive the corresponding link measurement request frame. In one embodiment, the link measurement report frame may include a transmit antenna identification field 635 which may include the identifying number for the one or more antennas used to transmit this link measurement report frame. In one embodiment, the link measurement report frame may include a received channel power indicator (RCPI) field 640 which may include the received channel power of the corresponding link measurement request frame. In one embodiment, the received channel power indicator may be a power ratio measured in decibels referenced to one milliwatt (a dBm scale). In one embodiment, the link measurement report frame may include a received signal to noise indicator (RSNI) field 645 which may include the received signal to noise indication for the corresponding link measurement request frame in a dBm scale.

Referring back to FIG. 2, the quality of service of the communication between the first mobile device and the second mobile device via a fixed device may be compared 235 with quality of service of communication between the first mobile device and the second mobile device using the direct link. In one embodiment, this comparison may ensure that the quality of service will be higher through the direct link as compared with the quality of service through the fixed device. In one embodiment, the quality of service may be determined by a power ratio which includes a transmission power level and a received power level.

The quality of service between the two mobile devices using the direct link may be determined by the link measurement request and the link measurement report. In one embodiment, based on the link measurement request and report, the first mobile device may determine how much power was lost during the transmission. In one embodiment, based on the link measurement request and report, the first mobile device may determine the signal to interference ratio (SINR).

In one embodiment, the link measurement report may be compared with the communication parameters to determine if the direct link has superior quality of service, such as a higher SINR, over the fixed device. In one embodiment, the communication via the direct link has a higher quality of service if the signal to noise ratio is higher than the signal to noise ratio for communication via the fixed device. In one embodiment, the communication via the direct link has a higher quality of service if the power ratio, measuring the decrease in power, is less than the communication via the fixed device. In one embodiment, if the quality of service is higher using the direct link for communication, then a direct link may be established.

In one embodiment, a channel for the direct link may be selected 240. In one embodiment, one or more channels may be scanned to refresh candidate fixed devices. In one embodiment, nearby fixed devices may be discovered through the scan. A candidate fixed device may include one or more access points within the wireless shared media. In one embodiment, different channels may dwell on different bands. In one embodiment, fixed devices may be cached for future roaming. For example, a mobile device may periodically scan to detect candidate fixed devices so that as the mobile device moves it can timely associate with wireless share media.

By checking the working channels and the received signal strength indicators (RSSI) of the cached candidate fixed devices, the first mobile device may select the best channel. In one embodiment, the best channel may have the least noise. In one embodiment, the best channel may have no fixed devices dwelling on that channel. In one embodiment, the best channel may be an unused channel. In one embodiment, all the channels may be used and the best channel maybe an old channel that was previously used.

In one embodiment, information may be sent 245 to the mobile device over the direct link via the channel. In one embodiment, the information sent may be peer-to-peer communication. In one embodiment, the first mobile device may communicate with the second mobile device over the direct link via the channel. In one embodiment, the communication may be an independent basic service set (IBSS).

Figure 7:
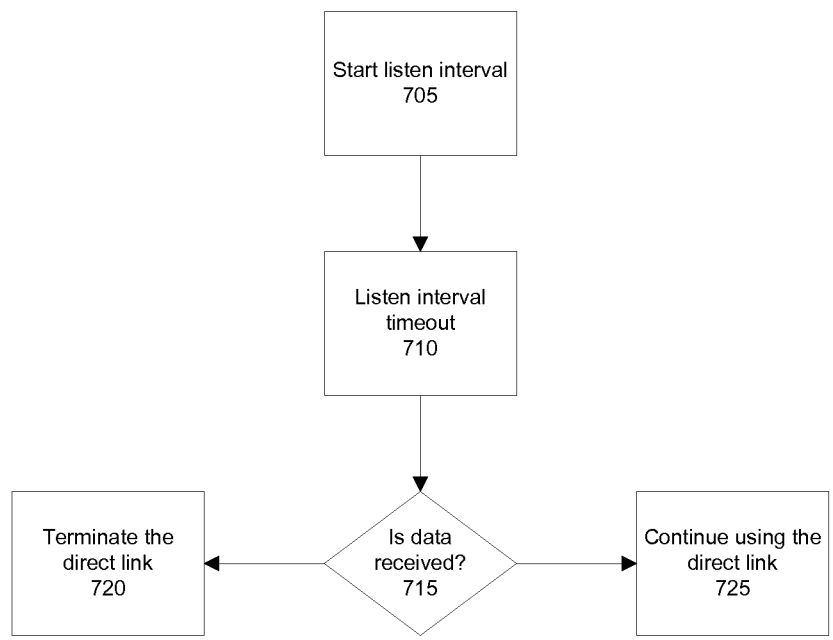
FIG. 7 illustrates one embodiment of a logic flow for terminating a direct link.

FIG. 7 illustrates one embodiment of a logic flow for terminating a direct link. In one embodiment, if there is not a sufficient amount of data traffic over the direct link via the channel, the channel may be terminated. In one embodiment, when communication begins over the channel, a timer may be started 705. The timer may be set of a listen interval 710. In one embodiment, the listen interval may be 1 second to 10 seconds. In one embodiment, the listen interval may be 3 seconds to 5 seconds. When the listen interval ends or times out 710, it may be determined 715 whether data was transmitted over the listen interval. If no data was transmitted over the listen interval or an insufficient amount of data was transmitted, then the channel may be terminated 720 and the first mobile device and the second mobile device may communicate via the fixed device. If a sufficient amount of data was transmitted over the listen interval, then the channel may continue 725 to provide a direct link and a new listen interval may be established.

Figure 8:
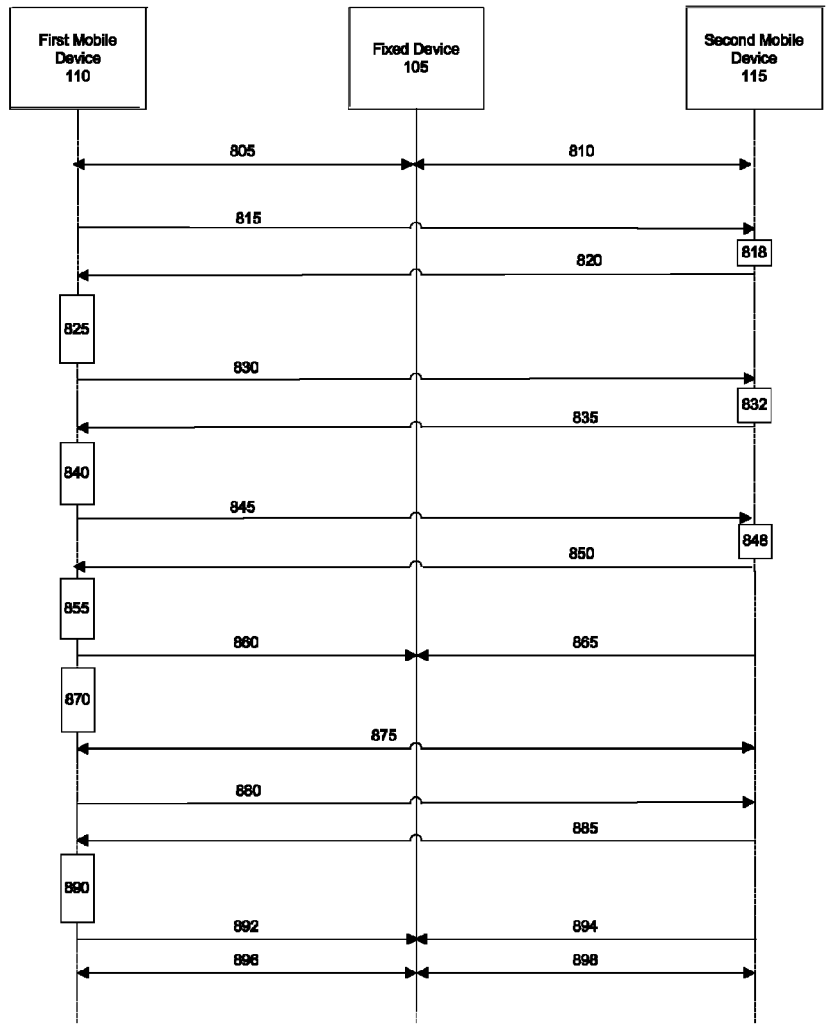
FIG. 8 illustrates one embodiment of a sequence chart.

FIG. 8 illustrates one embodiment of a sequence chart. In one embodiment, the sequence chart is the sequence of the 802.11z direct link communication. The sequence chart may be implemented by the mobile devices 110, 115 and the fixed device 105, as discussed in FIG. 1. The first mobile device 110 may communicate with the second mobile device 115 via the fixed device 105. The first mobile device 110 may communicate 805 with the fixed device 105 and the fixed device 105 may communicate 810 with the second mobile device 115. Based on the communication parameters in the packets communicated 805, 810, a direct connection setup may be triggered.

In one embodiment, once a direct connection setup is triggered, the first mobile device 110 may determine whether the second mobile device 115 is a peer. The first mobile device 110 may send a layer two service discovery request 815 to the second mobile device 115. The second mobile device 115 may receive and parse 818 the layer two service discovery request. The second mobile device may send a layer two service discovery response 820 to the first mobile device 110 indicating whether the second mobile device 115 is a peer. If the first mobile device 110 and the second mobile device 115 are not peers and/or if there is no response, then a direct link may not be established 825.

In one embodiment, if the first mobile device 110 and the second mobile device 115 are peers, then a quality of service for a direct link between the first mobile device 110 and the second mobile device 115 may be determined. A link measurement request 830 may be sent from the first mobile device 110 to the second mobile device 115. The second mobile device 115 may receive and parse 832 the link measurement request. The second mobile device 115 may respond by sending a link measurement report 835 to the first mobile device 110 indicating the quality of service of the direct link. If the quality of service for the first and second mobile devices 110, 115 communicating with the direct link is less than the quality of service for the first and second mobile devices 110, 115 communicating through the fixed device 105 and/or if there is no response from the second mobile device 115, then a direct link may not be established 840.

In one embodiment, if the quality of service of the direct link is higher than the quality of service via the fixed device 105, then the first mobile device 110 may send a TDLS request 845 to the second mobile device 115. The second mobile device 115 may receive and parse 848 the TDLS request and send a TDLS response 850 to the first mobile device 110. After the direct link is established through layer two service discovery exchanges, link measurement exchanges, and TDLS Setup procedures, the two mobile devices may directly communicate with each other. If the TDLS response 850 does not work and/or if the second mobile device 115 does not send a TDLS response, then a direct link may not be established 855.

In one embodiment, the first mobile device 110 and the second mobile device 115 may power save 860, 865. In one embodiment, the fixed device 105 may continue to buffer packets from external devices (i.e. other mobile devices) for the first and second mobile devices 110, 115. The content may be saved and the channel for the direct link may be switched 870.

In one embodiment, the first mobile device 110 and the second mobile device 115 may communicate 875 using the direct link. The first mobile device 110 may determine if the direct link is being sufficiently used and/or if the direct link should be terminated. The first mobile device 110 may send a notification 880 to the second device 115 during a listen interval. The second mobile device 115 may send a confirmation 885 to the first mobile device 110. If the confirmation 885 is received before the end of the listen interval, then the direct link may continue to be used by the first and second mobile device 110, 115. If the listen interval ends (i.e., times out) before a confirmation 885 from the second mobile device 115 is received, then the first mobile device 110 and the second mobile device 115 may restore communication 890 through the fixed device 105. In one embodiment, restoring communication 890 via the fixed device may include restoring context and switching the channel.

In one embodiment, the first mobile device 110 may power up 892 with the fixed device 105 and the second mobile device 115 may power up 894 with the fixed device 105. The first mobile device 110 may communicate with the second mobile device 115 via the fixed device 105. The first mobile device 110 may communicate 896 with the fixed device 105. The second mobile device 115 may communicate 898 with the fixed device 105.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
triggering a direct connection setup based on one or more communication parameters communicated with a mobile device via a fixed device;
determining whether the mobile device is a peer;
comparing quality of service with the mobile device via the fixed device with quality of service of the mobile device via a direct link;
selecting a channel for the direct link; and
sending information to the mobile device over the direct link via the channel, and
the triggering comprising:
receiving one or more unicast data packets;
determining whether at least a threshold percentage of the received unicast data packets are from the mobile device; and
determining whether a number of the unicast data packets received from the mobile device exceeds an amount threshold.

2. The method of claim 1, the triggering a direct connection setup comprising:
receiving a plurality of packets from communication with the mobile device via the fixed device;
updating the one or more communication parameters based on the plurality of packets; and
determining whether the one or more communication parameters exceed an indicator threshold.

3. The method of claim 1, the triggering a direct connection setup based on one or more communication parameters comprising triggering a direct connection setup based on one or more of a received signal strength indicator, transmit/receive reentries, missed beacons and packet error rate.

4. The method of claim 1, further comprising:
determining whether to terminate the direct link; and
sending information to the mobile device via the fixed device.

5. The method of claim 1, the determining whether the mobile device is a peer comprising:
sending a layer two service discovery request using a tunneled direct link setup (TDLS) frame format and link identifier elements; and
receiving a layer two service discovery response.

6. The method of claim 1, the determining whether the mobile device is a peer comprising:
sending a tunneled direct link setup (TDLS) frame format wherein the TDLS frame format includes a LLC/SNAP header field, a remote frame type field, a packet type field set to either to Layer 2 Services Discovery Request or to Layer 2 Services Discovery Response, and an information field.

7. The method of claim 1, the comparing quality of service with the mobile device via the fixed device with quality of service via a direct link to the mobile device comprising:
sending a link measurement request to the mobile device; and
receiving a link measurement report to determine the quality of service via the direct link to the mobile device.

8. The method of claim 1, the selecting a channel for the direct link comprising:
scanning one or more channels to refresh one or more candidate fixed devices; and
caching the one or more candidate fixed devices for future roaming.

9. The method of claim 1, the comparing quality of service with the mobile device via the fixed device with quality of service of the mobile device via a direct link comprising:
comparing a power loss ratio of the mobile device via the fixed device with a power loss ratio of the mobile device via a direct link.

10. The method of claim 1, the comparing quality of service with the mobile device via the fixed device with quality of service of the mobile device via a direct link comprising:
comparing a signal to interference ratio (SINR) of the mobile device via the fixed device with a signal to interference ratio (SINR) of the mobile device via a direct link.

11. A wireless communications device comprising:
a wireless interface subsystem; and
a processor and memory, the memory including data and instructions to operate the processor to:
trigger a direct connection setup based on one or more communication parameters communicated with a mobile device via a fixed device;
determine whether the mobile device is a peer,
compare quality of service with the mobile device via the fixed device with quality of service of the mobile device via a direct link,
send information to the mobile device over the direct link via the channel, and
the instructions to operate the processor to trigger a direct connection setup comprising instructions to operate the processor to:
receive one or more unicast data packets,
determine whether at least a threshold percentage of the received unicast data packets are from the mobile device, and
determine whether a number of the unicast data packets received from the mobile device exceeds an amount threshold.

12. The wireless communications device of claim 11, the processor is operative to:
determine whether to terminate the direct link, and
send information to the mobile device via the fixed device.

13. The wireless communications device of claim 11, the instructions to operate the processor to trigger a direct connection setup comprising instructions to operate the processor to:
receive a plurality of packets from communication with the mobile device via the fixed device,
update the one or more communication parameters based on the plurality of packets, and
determine whether the one or more communication parameters exceed an indicator threshold.

14. The wireless communications device of claim 11, the instructions to operate the processor to determine whether the mobile device is a peer comprising instructions to operate the processor to:
send a layer two service discovery request using a tunneled direct link setup (TDLS) frame format and link identifier elements, and
receive a layer two service discovery response.

15. The wireless communications device of claim 11, the instructions to operate the processor to compare quality of service with the mobile device via the fixed device with quality of service via a direct link to the mobile device comprising instructions to operate the processor to:
send a link measurement request to the mobile device, and
receive a link measurement report to determine the quality of service via the direct link to the mobile device.

16. The wireless communications device of claim 11, the processor to:
select a channel for the direct link.

17. The wireless communications device of claim 16, the instructions to operate the processor to select a channel for the direct link comprising instructions to operate the processor to:
scan one or more channels to refresh one or more candidate fixed devices, and
cache the one or more candidate fixed devices for future roaming.

18. The wireless communications device of claim 11, the instructions to operate the processor to compare quality of service with the mobile device via the fixed device with quality of service via a direct link to the mobile device comprising instructions to operate the processor to:
compare a power loss ratio of the mobile device via the fixed device with a power loss ratio of the mobile device via a direct link.

19. The wireless communications device of claim 11, the instructions to operate the processor to compare quality of service with the mobile device via the fixed device with quality of service via a direct link to the mobile device comprising instructions to operate the processor to:
compare a signal to interference ratio (SINR) of the mobile device via the fixed device with a signal to interference ratio (SINR) of the mobile device via a direct link.

20. A system comprising:
a first mobile device with a wireless interface subsystem, a digital display, a processor and memory, the memory including data and instructions to operate the processor to:
trigger a direct connection setup based on one or more communication parameters communicated with a second mobile device via a fixed device,
determine whether the second mobile device is a peer,
compare quality of service with the second mobile device via the fixed device with quality of the service of second mobile device via a direct link,
select a channel for the direct link,
send information to the second mobile device over the direct link via the channel, and
wherein instructions to operate the processor to trigger a direct connection setup comprise instructions to operate the processor to:
receive one or more unicast data packets,
determine whether at least a threshold percentage of the received unicast data packets are from the mobile device, and
determine whether a number of the unicast data packets received from the mobile device exceeds an amount threshold.

21. The system of claim 20, the fixed device to communicate packets between the first mobile device and the second mobile device.

22. The system of claim 21, the fixed device comprising a first access point on a provider network and a second access point on the provider network.

* * * * *

UNITED STATES PATENT AND TRADEMARK OFFICE
CERTIFICATE OF CORRECTION

PATENT NO. : 8,762,543 B2
APPLICATION NO. : 12/637987
DATED : June 24, 2014
INVENTOR(S) : Zongming Yao et al.

Page 1 of 1

It is certified that error appears in the above-identified patent and that said Letters Patent is hereby corrected as shown below:

On Title page 2, under "Other Publications", in column 1, line 2, Delete "m ailed" and insert -- mailed --, therefor.

Signed and Sealed this
Fourteenth Day of October, 2014

Michelle K. Lee
*Deputy Director of the United States Patent and Trademark Office*